United States Patent
Ueno

(10) Patent No.: US 7,684,214 B2
(45) Date of Patent: Mar. 23, 2010

(54) SELF-OSCILLATING SWITCHING REGULATOR

(75) Inventor: Tetsuya Ueno, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 80 days.

(21) Appl. No.: 12/228,403

(22) Filed: Aug. 11, 2008

(65) Prior Publication Data

US 2009/0051345 A1    Feb. 26, 2009

(30) Foreign Application Priority Data

Aug. 21, 2007  (JP) .............................. 2007-214528

(51) Int. Cl.
*H02M 3/335*  (2006.01)

(52) U.S. Cl. ......................................................... 363/19

(58) Field of Classification Search ................... 363/18, 363/19, 140, 131, 95
See application file for complete search history.

(56) References Cited

U.S. PATENT DOCUMENTS 6,370,041 B2 *  4/2002  Yasumura ..................... 363/19

FOREIGN PATENT DOCUMENTS

| JP | 5-304778 | 11/1993 |
| JP | 2004-320856 | 11/2004 |

* cited by examiner

*Primary Examiner*—Shawn Riley
(74) *Attorney, Agent, or Firm*—Jordan and Hamburg LLP

(57) ABSTRACT

A self-oscillating switching regulator includes a control winding N3 allowing a voltage to be induced therein by a magnetic flux created in a primary winding N1 of a high frequency transformer T, a capacitor C3 charged by the voltage induced in the control winding N3, a transistor Q2 that is turned off when the voltage across the capacitor C3 reaches a predetermined level, a switching element Q1 driven by the transistor Q2 to switch on or off an input current through the primary winding N1 of the high frequency transformer T, and a control winding adjuster for changing by switching the number of turns of the control winding N3 on the basis of the operating temperature.

5 Claims, 5 Drawing Sheets

SELF-OSCILLATING SWITCHING REGULATOR

This application is based on an application No. 2007-214528 filed in Japan, the contents of which are hereby incorporated by reference.

BACKGROUND OF THE INVENTION

1. Field of the Invention

The present invention relates to switching regulators of self-oscillating mode (hereinafter occasionally referred to as an "RCC (Ringing Choke Converter)" mode), which include a control winding that allows a voltage to be induced therein by a magnetic flux created in the primary winding of a high frequency transformer, a capacitor charged by the voltage induced in the control winding, a transistor that is turned off when the voltage across the capacitor reaches a specified level, and a switching element driven by the transistor to switch on or off the input current through the primary winding of the high frequency transformer.

2. Description of the Related Art

In many of the appliances with image forming devices, such as copiers, the DC loads are powered by: decreasing by a transformer an AC voltage input from a commercial AC power supply; converting the voltage into a DC voltage by a rectifier circuit and a smoothing circuit; and then passing the DC voltage through a low-voltage power supply circuit serving as a regulator, thereby stabilizing the DC voltage at a specified level.

In recent years, switching mode low-voltage power supply circuits utilizing switching elements have been in the mainstream. In particular, switching regulators of self-oscillating mode are widely used because of their simplicity in circuit structure and cheapness.

Examples of this kind of switching regulator are disclosed in Japanese Unexamined Patent Publication Nos. 5-304778 and 2004-320856.

FIG. 5 shows an RCC mode switching regulator having a control winding N3 that allows a voltage to be induced therein by a magnetic flux created in a primary winding N1 of a high frequency transformer T, a capacitor C3 charged by the voltage induced in the control winding N3, a transistor Q2 that is turned off when the voltage across the capacitor C3 reaches a specified level, and a switching element Q1 driven by the transistor Q2 to switch on or off the input current through the primary winding N1.

The RCC mode switching regulator is influenced by ambient temperature and the operating temperature of the circuit, causing fluctuations in the DC amplification factor $h_{fe}$ of the transistor Q2 and the capacitance of the capacitor C3. This posed problematic fluctuations in the oscillating frequency, that is, the switching frequency of the switching element Q1, even at a constant load current.

For example, if ambient temperature rises, the capacitance of the capacitor C3 decreases and the DC amplification factor $h_{fe}$ of the transistor Q2 increases at the same time, which makes faster the switching operation of the input current through the primary winding N1 by the switching element Q1, which is driven by the transistor Q2.

The switching regulator also experiences what is called noise terminal voltage generated at a frequency of an integer multiple of the oscillating frequency. This voltage refers to external transmission of a noise occurring in the circuit through the AC line.

The noise terminal voltage is imposed limits by a safety standard, among which those for 150 kHz through approximately 500 kHz are set to decrease logarithmically.

At an approximately constant load current such as when the appliance is on stand-by, the switching frequency is usually stable at a specified frequency and thus the noise terminal voltage is below the above-mentioned limits, but, as described above, the switching frequency might drift because of the influence of ambient temperature, resulting a possibility of deviation from the limits.

In addition, if the switching frequency increases, so does the switching loss resulting in the problem of deteriorated conversion efficiency of the switching regulator.

These circumstances necessitate providing the switching regulator with a cooling fan and selecting circuit elements with superior temperature properties such as for the capacitor, in order to keep ambient temperature below specified temperatures. However, this causes an increase in cost associated with the enlarged occupied area as well as increased costs for the elements. There are also problems including noises from the cooling fan.

SUMMARY OF THE INVENTION

In view of the foregoing problems, an object of the present invention is to provide a self-oscillating switching regulator capable of, without using a cooling fan, inhibiting the drift of the switching frequency caused by fluctuations in ambient temperature and the operating temperature of the circuit.

In order to achieve the foregoing object, a self-oscillating switching regulator of the present invention includes: a control winding allowing a voltage to be induced therein by a magnetic flux created in the primary winding of a high frequency transformer; a capacitor charged by the voltage induced in the control winding; a transistor that is turned off when the voltage across the capacitor reaches a predetermined level; a switching element driven by the transistor to switch on or off the input current through the primary winding of the high frequency transformer; and a control winding adjuster for changing by switching the number of turns of the control winding on the basis of the operating temperature.

DESCRIPTION OF THE PREFERRED EMBODIMENTS

A self-oscillating switching regulator of the present invention will be described by referring to a copier, which is an image forming device to which the switching regulator is applied.

Figure 2:
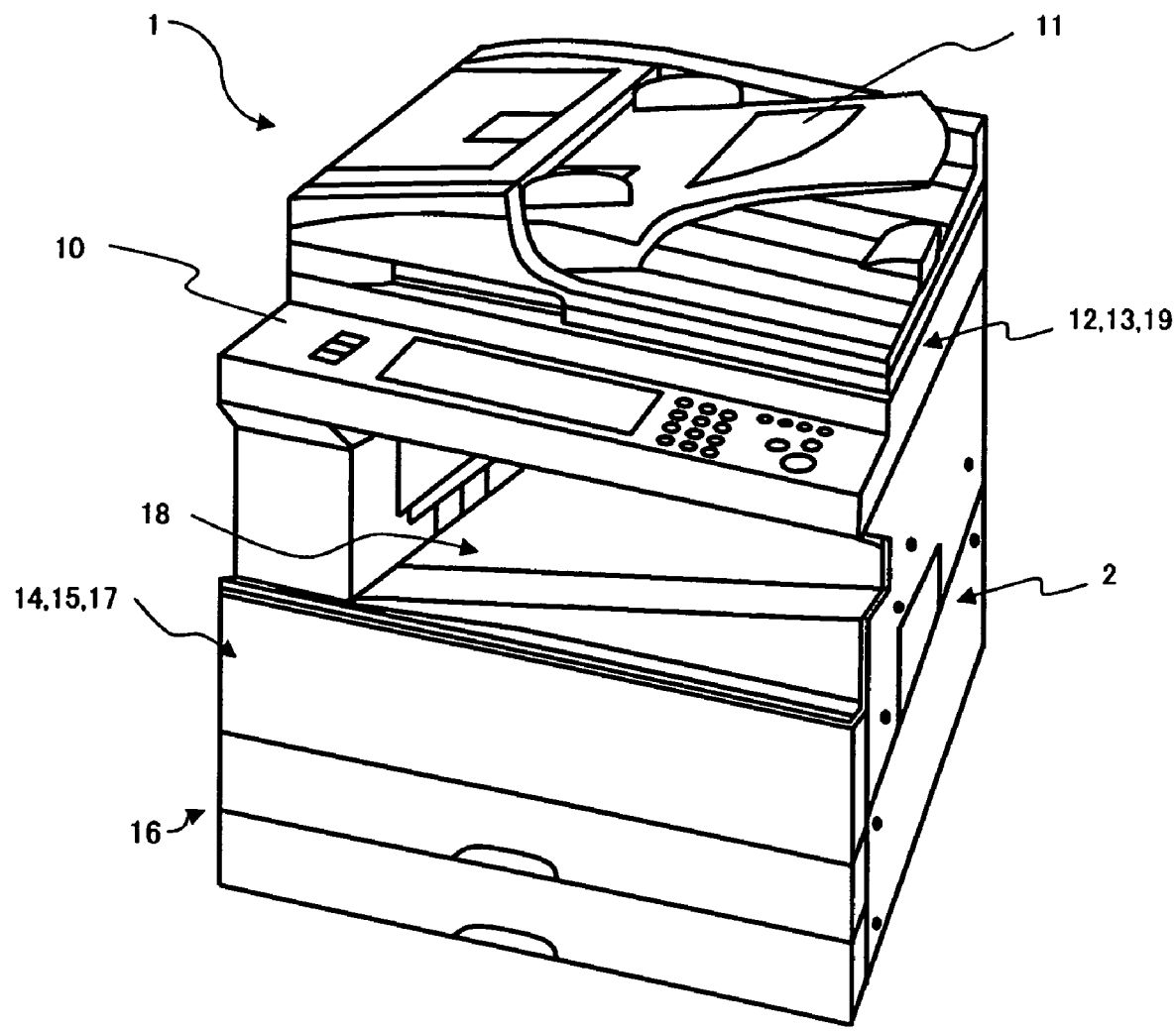
FIG. 2 is an external view of an image forming device (copier)

Referring to FIG. 2, a copier 1 of electrophotographic mode includes: function blocks including an operating portion 10, an image reading portion 12, an image processing portion 13, an image forming portion 14, a thermal fixing portion 15, sheet trays 16, a conveyer mechanism 17, and an output tray 18; a controller 19 for electronically controlling these function blocks; and a power supply 2 for supplying necessary power to the function blocks and the controller 19.

The operating portion 10 includes a display portion with a liquid crystal screen and a start button for starting a copying operation and the like.

The image reading portion 12 is fed documents from a document feeding tray 11 on a sheet-by-sheet basis and reads the image on each document by photoelectrically converting the image into image data.

The image processing portion 13 converts the image data read by the image reading portion 12 into output image data, and the image forming portion 14 forms a toner image on the basis of the output image data onto a photoreceptor. The toner image is transferred onto a sheet of paper fed from the sheet trays 16 through the conveyer mechanism 17.

The thermal fixing portion 15 thermally fixes the toner image transferred onto the sheet by the image forming portion 14, after which the sheet of paper is output onto the output tray 18.

Figure 3:
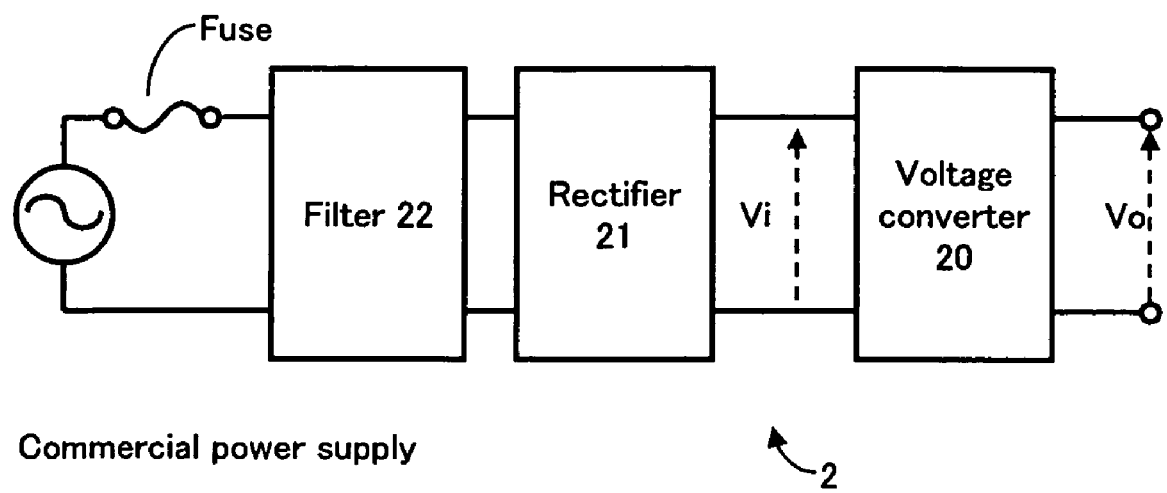
FIG. 3 is a diagram for illustrating a power supply.

Referring to FIG. 3, the power supply 2 includes an overcurrent protecting fuse located on the feeding line of a commercial power supply, a filter 22 for inhibiting line noises, a rectifier 21 including a diode bridge for rectifying AC voltage and a capacitor for smoothing AC voltage, and a voltage converter 20, which is the switching regulator according to the present invention.

The voltage converter 20 stabilizes an input voltage Vi input from the rectifier 21 and outputs the voltage as an output voltage Vo, thereby supplying power to the DC loads of the copier 1 such as the controller 19.

Figure 1:
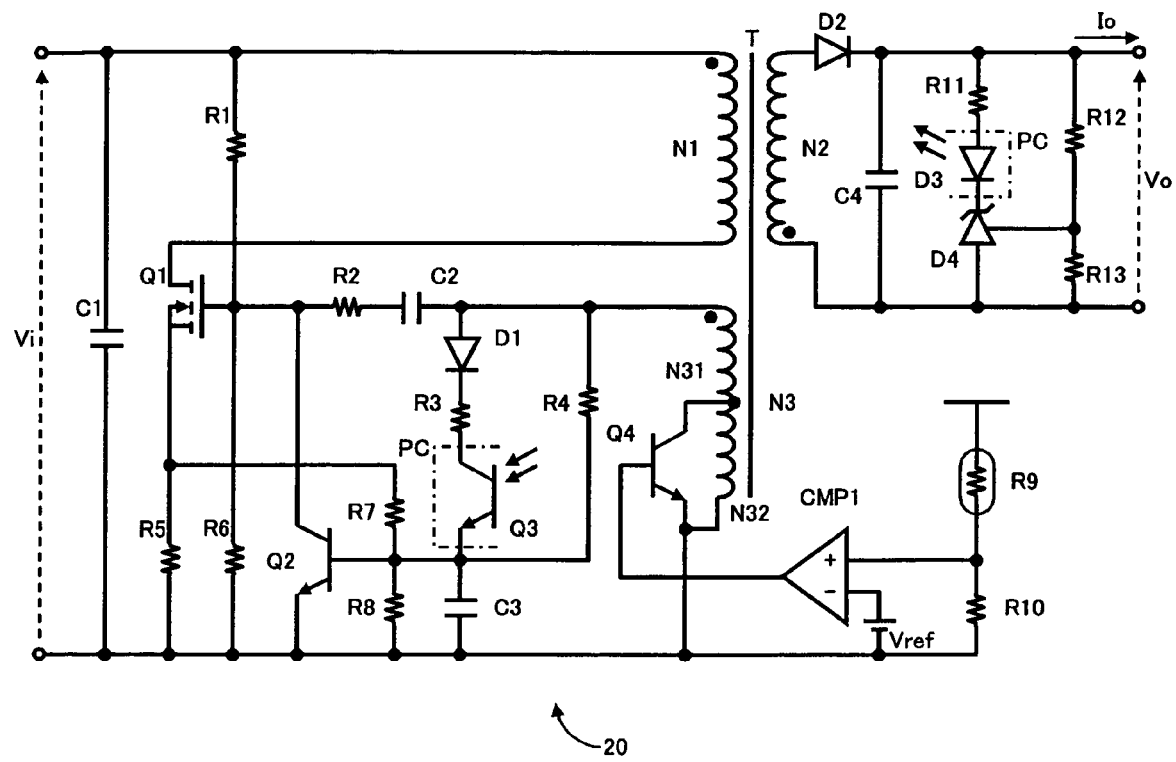
FIG. 1 is a diagram for illustrating a self-oscillating switching regulator (voltage converter)

Referring to FIG. 1, the voltage converter 20 is an RCC mode switching regulator including: a high frequency transformer T including a primary winding N1, a secondary winding N2, and a control winding N3 that allows a voltage to be induced therein by a magnetic flux created in the primary winding N1; a capacitor C3 charged by the voltage induced in the control winding N3; a transistor Q2 that is turned off when the voltage across the capacitor C3 reaches a predetermined level; and a power MOSFET switching element Q1 driven by the transistor Q2 to switch on or off the input current through the primary winding N1 of the high frequency transformer T.

The secondary winding N2 of the high frequency transformer T operates in a phase opposite the phase of the primary winding N1 while the control winding N3 operates in the same phase as that of the primary winding N1.

When the input voltage Vi rectified by the rectifier 21 is applied to the voltage converter 20, the voltage is divided at resistors R1 and R6 and then applied to the gate of the switching element Q1, thereby allowing a current to start flowing through the primary winding N1.

This causes a voltage to be created in the control winding N3 in commensurate with the turns ratio thereof to the primary winding N1. This in turn causes a larger voltage to be applied to the gate of the switching element Q1, thereby keeping the switching element Q1 in the ON state.

The voltage created in the control winding N3 charges the capacitor C3 through a resistor R4, and when the voltage across the capacitor C3 reaches a predetermined level, the transistor Q2 is turned on, since the base thereof is coupled to the capacitor C3.

Turning the transistor Q2 on decreases the voltage applied to the gate of the switching element Q1 to turn it off.

Turning the switching element Q1 off causes a counter electromotive force to be developed in the secondary winding N2 to conduct a diode D2, and the energy stored in the secondary winding N2 accumulates on a capacitor C4 and is output as an output voltage Vo.

Then the charge accumulating on the capacitor C3 is discharged through resistors R8, R7, and R5 to turn the transistor Q2 off, thereby again turning the switching element Q1 on.

This operation is repeated at a predetermined frequency to generate the output voltage Vo.

The voltage converter 20 also includes a feedback path such that when the output voltage Vo rises above the breakdown voltage (Zener voltage) of a Zener diode D4, a current flows through a light emitting diode D3 coupled in series to the Zener diode D4 to make the diode D3 emit light and thereby turn on a phototransistor Q3 with which the light emitting diode D3 constitutes a photocoupler PC.

Turning the phototransistor Q3 on causes the capacitor C3 to be charged through the current path through the resistor R3 in addition to the current path through the resistor R4, thereby shortening the time for charging the capacitor C3.

This in turn shortens the period of time when the switching element Q1 is turned on and prevents the output voltage Vo from rising. Thus, providing the feedback path keeps the output voltage Vo at a predetermined level.

If the operating temperature of the power supply 2 rises due to, for example, heating of the switching element Q1 and resistors constituting the voltage converter 20, then the capacitor C3 might decrease its capacitance due to its temperature properties, thereby making high the switching frequency of the switching element Q1.

This involves fluctuations in the frequency of the noise terminal voltage, which is generated at a frequency of an integer multiple of the switching frequency, resulting a possibility of deviation from limits imposed by a safety standard.

In order to prevent the frequency of the noise terminal voltage from fluctuating even though the capacitor C3 might decrease its capacitance due to its temperature properties, the voltage converter 20 is provided with a control winding adjuster.

The control winding adjuster includes a thermistor R9 for detecting ambient temperature, a resistor R10, a comparator CMP1, and a transistor Q4, and adjusts the number of turns of the control winding N3 on the basis of ambient temperature.

The comparator CMP1 accepts at its non-inverting input terminal a divided voltage from a bridge circuit including the thermistor R9 and the resistor R10 coupled in series to one another. At the inverting input terminal, the comparator CMP1 accepts input of a reference voltage $V_{ref}$ that corresponds to a reference temperature. The output of the comparator CMP1 is input to the base of the transistor Q4.

The control winding N3 includes a first winding N31 and a second winding N32 coupled in series to one another, and the collector of the transistor Q4 having its emitter grounded is coupled to the node of the first winding N31 and the second winding N32.

When the temperature detected at the thermistor R9 is lower than the reference temperature, the transistor Q4 is turned off, while being turned on when the temperature is higher than the reference temperature.

Specifically, when the operating temperature rises and thus the divided voltage of the thermistor R9 and the resistor R10 exceeds the reference voltage $V_{ref}$, then the output of the comparator CMP1 turns the transistor Q4 on. This short-circuits the second winding N32, thereby rendering the control winding N3 substantially constituted of the first winding N31 alone.

Since the voltage created in the control winding N3 is lowered, if the capacitance of the capacitor C3 should decrease due to a rise in temperature, a longer time for charging the capacitor C3 is required. This inhibits the switching frequency from drifting to the high frequency spectrum.

When the operating temperature decreases and thus the divided voltage of the thermistor R9 and the resistor R10 falls below the reference voltage $V_{ref}$, then the output of the comparator CMP1 turns the transistor Q4 off. This renders the control winding N3 constituted of the first winding N31 and the second winding N32.

Since the voltage created in the control winding N3 increases, if the capacitance of the capacitor C3 should increase due to a decrease in temperature, the time required for charging the capacitor C3 is shortened. This inhibits the switching frequency from drifting to the low frequency spectrum.

More specifically, when the transistor Q4 is turned on, the control winding adjuster short-circuits the second winding N32 to decrease the number of turns of the control winding N3 and thus lower the voltage created in the control winding N3, thereby elongating the time required for charging the capacitor C3.

As a result, the drift of the oscillating frequency due to a rise in temperature is inhibited.

The number of turns of each of the first winding N31 and the second winding N32 is set on the basis of the value of the resistor R4 and the temperature properties of the capacitor C3 in such a manner that the fluctuations of switching frequency of the switching element Q1 are secured within a range of tolerance.

Other embodiments of the present invention will be described below.

In the above embodiment, the number of turns of the control winding N3 is set on the basis of the temperature properties of the capacitor C3, that is, on the basis of the capacitance of the capacitor C3, which decreases upon rise in the operating temperature. It is also possible to base this setting on the current amplification factor $h_{fe}$ of the transistor Q2, which fluctuates upon rise in the operating temperature, or on both the current amplification factor $h_{fe}$ of the transistor Q2 and the capacitance of the capacitor C3. Either case prevents the deviation of the noise terminal voltage from its limits due to the drift of the switching frequency.

The thermistor R9, which detects the operating temperature of the voltage converter 20, is desirably arranged in the vicinity of the capacitor C3. Yet the thermistor R9 may be arranged anywhere else insofar as the effect that the operating temperature has on the capacitor C3 will be accurately reflected.

In the above embodiment, the self-oscillating switching regulator according to the present invention is mounted in the copier 1, which is an example of the image forming devices. It will be readily understood that the switching regulator finds applications not only in the image forming devices but also in any appliances that need DC stabilizing power supplies.

In the above embodiment, the control winding N3 includes the first winding N31 and the second winding N32 coupled in series to one another. It is possible to form a tap on one of the windings and couple the collector of the transistor Q4 to the tap. It is further possible to constitute the control winding N3 with separate first and second windings of different turns and provide a switch by which to decide which of the windings to conduct.

Figure 4:
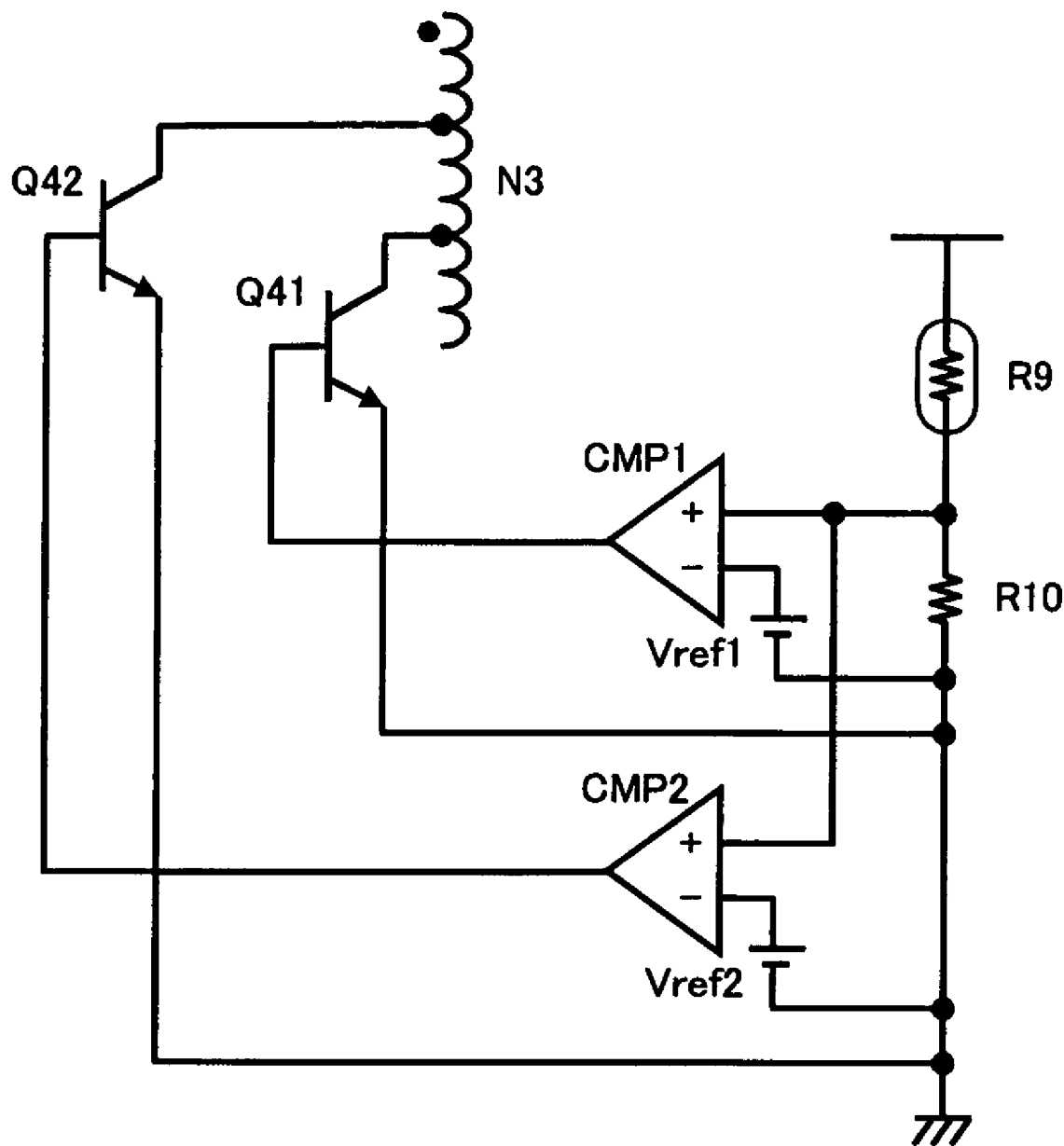
FIG. 4 is a diagram for illustrating a control winding adjuster according to another embodiment.
Figure 5:
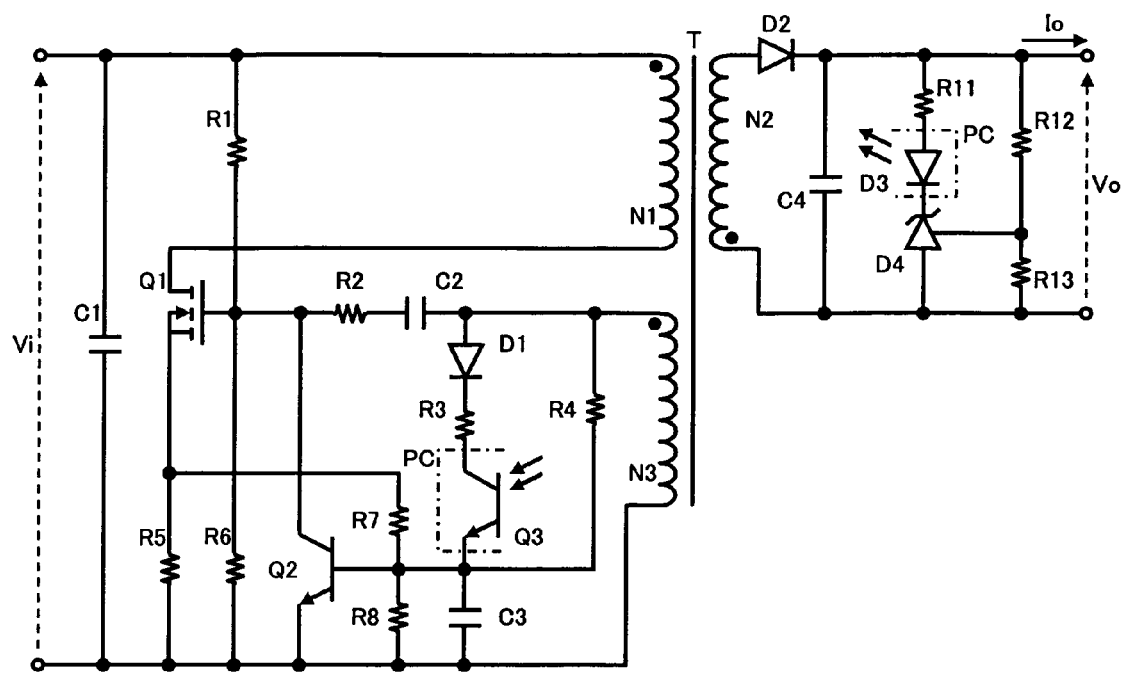
FIG. 5 is a diagram for illustrating a conventional self-oscillating switching regulator.

In the above embodiment, the control winding adjuster uses a single comparator CMP1 to compare the divided voltage of the thermistor R9 and the resistor R10 with a single reference voltage $V_{ref}$, in changing by switching the number of turns of the control winding N3. It is also possible to provide a plurality of comparators of different reference voltages and switch the number of turns of the control winding N3 in a plurality of steps on the basis of the operating temperature. For example, referring to FIG. 4, the number of turns of the control winding N3 may be switched in two steps by using two comparators CMP1 and CMP2 that will respectively use reference voltages $V_{ref1}$ and $V_{ref2}$ in comparison.

The above embodiments have been described by way of example and will not limit the present invention; it will be appreciated that various modifications can be made to the specific details of the constituent parts of the present invention without departing from the scope of the present invention. Also it will be appreciated that the above embodiments may be combined as necessary.

What is claimed is:

1. A self-oscillating switching regulator comprising:
    a control winding allowing a voltage to be induced therein by a magnetic flux created in a primary winding of a high frequency transformer;
    a capacitor charged by the voltage induced in the control winding;
    a transistor that is turned off when the voltage across the capacitor reaches a predetermined level;
    a switching element driven by the transistor to switch on or off an input current through the primary winding of the high frequency transformer; and
    a control winding adjuster for changing by switching the number of turns of the control winding on the basis of an operating temperature.

2. The self-oscillating switching regulator according to claim 1, wherein when the operating temperature exceeds a predetermined temperature, the control winding adjuster reduces by switching the number of turns of the control winding.

3. The self-oscillating switching regulator according to claim 1, wherein the number of turns of the control winding is switchable in a plurality of steps on the basis of the operating temperature by the control winding adjuster.

4. The self-oscillating switching regulator according to claim 1, wherein the control winding adjuster comprises:
    a bridge circuit including a resistor and a thermistor for detecting the operating temperature of a circuit of the switching regulator, the resistor and the thermistor being coupled in series to one another;
    one or a plurality of comparators for comparing a divided voltage of the bridge circuit with a reference voltage or reference voltages; and
    one or a plurality of transistors each including a collector, an emitter, and a base, the collector being coupled to a tap formed in the middle of the control winding, the base being coupled to an output terminal of the corresponding comparator.

5. An image forming device comprising:
    a self-oscillating switching regulator set forth in claim 1; and
    a controller being supplied direct current power from the switching regulator.

* * * * *